3,144,384
PHOSPHORUS CONTAINING SULFUR COM-
POUNDS AND METHOD OF USING SAME
Paul C. Aichenegg, Prairie Village, Kans., assignor to
Chemagro Corporation, New York, N.Y., a corporation
of New York
No Drawing. Filed Jan. 26, 1962, Ser. No. 169,088
22 Claims. (Cl. 167—22)

This invention relates to novel phosphorus containing disulfides and their use as pesticides.

It is an object of the present invention to prepare novel phosphoryl disulfides.

Another object is to prepare novel thiophosphoryl disulfides.

An additional object is to prepare improved compositions and to develop new processes for killing nematodes.

A further object is to prepare improved compositions and to develop new processes for killing fungi.

Yet another object is to prepare improved compositions and to develop new processes for killing insects.

Still further objects and the entire scope of applicability of the present invention will become apparent from the detailed description given herinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has been found that these objects can be attained by preparing compounds having the formulae

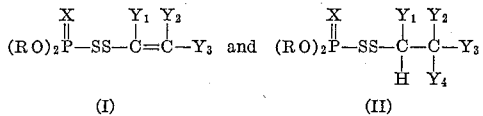

where R is selected from the group consisting of lower alkyl, phenyl, lower alkylphenyl, chlorophenyl and bromophenyl, $Y_1$, $Y_2$ and $Y_3$ are selected from the group consisting of hydrogen, chlorine and bromine, at least two of them being a halogen of atomic weight 35 to 80, $Y_4$ is chlorine or bromine, and X is a chalcogen of atomic weight between 16 and 32, i.e., it is oxygen or sulfur.

The compounds of Formula I have superior pesticidal properties to the compounds of Formula II.

The compounds where R is lower alkyl, and particularly methyl or ethyl, are better pesticides than the corresponding aromatic compounds.

Examples of compounds coming within the present invention are

O,O-dimethyl-thiophosphoryl-(2,2-dichlorovinyl) disulfide;
O,O-dimethyl-thiophosphoryl-(1,2-dichlorovinyl) disulfide;
O,O-dimethyl-thiophosphoryl-(1,2,2-trichlorovinyl) disulfide;
O,O-dimethyl-thiophosphoryl-(1,2,2-trichloroethyl) disulfide;
O,O-dimethyl-thiophosphoryl-(2,2,2-trichloroethyl) disulfide;
O,O-dimethyl-thiophosphoryl-(1,2,2,2-tetrachloroethyl) disulfide;
O,O-dimethyl-phosphoryl-(2,2-dichlorovinyl) disulfide;
O,O-dimethyl-phosphoryl-(1,2-dichlorovinyl) disulfide;
O,O-dimethyl-phosphoryl-(1,2,2-trichlorovinyl) disulfide;
O,O-dimethyl-phosphoryl-(1,2,2-trichloroethyl) disulfide;
O,O-dimethyl-phosphoryl-(2,2,2-trichloroethyl) disulfide;
O,O-dimethyl-phosphoryl-(1,2,2,2-tetrachloroethyl) disulfide;
O,O-dimethyl-thiophosphoryl-(1,2-dibromovinyl) disulfide;
O,O-dimethyl-thiophosphoryl-(2,2-dibromovinyl) disulfide;
O,O-dimethyl-thiophosphoryl-(1-chloro-2-bromovinyl) disulfide;
O,O-dimethyl-thiophosphoryl-(1,2,2-tribromoethyl) disulfide;
O,O-dimethyl-thiophosphoryl-(1,2,2-tribromovinyl) disulfide;
O,O-dimethyl-thiophosphoryl-(1,2,2,2-tetrabromoethyl) disulfide;
O,O-dimethyl-phosphoryl-(1,2-dibromovinyl) disulfide;
O,O-dimethyl-phosphoryl-(2,2-dbromovinyl) disulfide;
O,O-dimethyl-phosphoryl-(1,2,2-tribromoethyl) disulfide;
O,O-diethyl-thiophosphoryl-(2,2-dichlorovinyl) disulfide;
O,O-diethyl-thiophosphoryl-(1,2-dichlorovinyl) disulfide;
O,O-diethyl-thiophosphoryl-(1,2,2-trichlorovinyl) disulfide;
O,O-diethyl-thiophosphoryl-(2,2,2-trichloroethyl) disulfide;
O,O-diethylthiophosphoryl-(1,2,2,2-tetrachloroethyl) disulfide;
O,O-diethyl-phosphoryl-(2,2-dichlorovinyl) disulfide;
O,O-diethyl-phosphoryl-(1,2-dichlorovinyl) disulfide;
O,O-diethyl-phosphoryl-(1,2,2-trichlorovinyl) disulfide;
O,O-diethyl-phosphoryl-(1,2,2-trichloroethyl) disulfide;
O,O-diethyl-phosphoryl-(2,2,2-trichloroethyl) disulfide;
O,O-diethyl-phosphoryl-(1,2,2,2-tetrachloroethyl) disulfide;
O,O-diethyl-thiophosphoryl-(1,2-dibromovinyl) disulfide;
O,O-diethyl-thiophosphoryl-(2,2-dibromovinyl) disulfide;
O,O-diethyl-thiophosphoryl-(1-bromo-2-chlorovinyl) disulfide;
O,O-diethyl-thiophosphoryl-(1,2,2-tribromoethyl) disulfide;
O,O-diethyl-thiophosphoryl-(2,2,2-tribromoethyl) disulfide;
O,O-diethyl-phosphoryl-(1,2-dibromovinyl) disulfide;
O,O-diethyl-phosphoryl-(2,2-dibromovinyl) disulfide;
O,O-diethyl-phosphoryl-(1,2,2-tribromovinyl) disulfide;
O,O-diethyl-phosphoryl-(1,2,2-tribromoethyl) disulfide;
O-methyl-O-ethyl-thiophosphoryl-(1,2-dichlorovinyl) disulfide;
O-methyl-O-ethyl-phosphoryl-(2,2-dichlorovinyl) disulfide;
O,O-dipropyl-thiophosphoryl-(1,2-dichlorovinyl) disulfide;
O,O-dipropyl-thiophosphoryl-(2,2-dichlorovinyl) disulfide;
O,O-dipropyl-thiophosphoryl-(1,2,2-trichlorovinyl) disulfide;
O,O-dipropyl-thiophosphoryl-(1,2,2-trichloroethyl) disulfide;
O,O-dipropyl-phosphoryl-(1,2-dichlorovinyl) disulfide;
O,O-dipropyl-phosphoryl-(2,2-dichlorovinyl) disulfide;
O,O-dipropyl-phosphoryl-(1,2,2-trichlorovinyl) disulfide;
O,O-dipropyl-phosphoryl-(2,2,2-trichloroethyl) disulfide;
O,O-dipropyl-thiophosphoryl-(1,2-dibromovinyl) disulfide;
O,O-dipropyl-phosphoryl-(2,2-dibromovinyl) disulfide;
O,O-diisopropyl-thiophosphoryl-(2,2-dichlorovinyl) disulfide;
O,O-diisopropyl-thiophosphoryl-(1,2-dichlorovinyl) disulfide;

O,O-diisopropyl-phosphoryl-(2,2 - dichlorovinyl) disulfide;
O,O-diisopropyl-thiophosphoryl-(1,2,2-trichlorovinyl) disulfide;
O,O-diisopropyl-phosphoryl-(1,2,2-trichloroethyl) disulfide;
O,O-dibutyl-thiophosphoryl-(1,2-dichlorovinyl) disulfide;
O,O-dibutyl-thiophosphoryl-(2,2-dichlorovinyl) disulfide;
O,O-dibutyl-thiophosphoryl-(1,2,2-trichlorovinyl) disulfide;
O,O-dibutyl-thiophosphoryl-(2,2,2-trichloroethyl) disulfide;
O,O-dibutyl-phosphoryl-(1,2-dichlorovinyl) disulfide;
O,O-dibutyl-phosphoryl-(2,2-dichlorovinyl) disulfide;
O,O-dibutyl-phosphoryl-(1,2,2-trichlorovinyl) disulfide;
O,O-dibutyl-thiophosphoryl-(1,2-dibromovinyl) disulfide;
O,O-dibutyl-phosphoryl-(2,2-dibromovinyl) disulfide;
O,O-di secondary butyl-thiophosphoryl-(1,2-dichlorovinyl) disulfide;
O,O-di tertiary butyl-thiophosphoryl-(2,2-dichlorovinyl) disulfide;
O,O-di tertiary butyl-phosphoryl-(1,2-dichlorovinyl) disulfide;
O,O-diphenyl-thiophosphoryl-(1,2-dichlorovinyl) disulfide;
O,O-diphenyl-thiophosphoryl-(2,2-dichlorovinyl) disulfide;
O,O-diphenyl-thiophosphoryl-(1,2,2-trichlorovinyl) disulfide;
O,O-diphenyl-thiophosphoryl-(1,2,2-trichloroethyl) disulfide;
O,O-diphenyl-phosphoryl-(1,2-dichlorovinyl) disulfide;
O,O-diphenyl-phosphoryl-(2,2-dichlorovinyl) disulfide;
O,O-diphenyl-phosphoryl-(perchlorovinyl) disulfide;
O,O-diphenyl-phosphoryl-(2,2,2-trichloroethyl) disulfide;
O,O-diphenyl-phosphoryl-(1,2-dibromovinyl) disulfide;
O,O-diphenyl-thiophosphoryl-(2,2-dibromovinyl) disulfide;
O,O-di-p-tolyl-thiophosphoryl-(1,2-dichlorovinyl) disulfide;
O,O-di-o-tolyl-phosphoryl-(2,2-dichlorovinyl) disulfide;
O,O-di-m-tolyl-thiophosphoryl-(1,2,2-trichlorovinyl) disulfide;
O,O-di-p-chlorophenyl-thiophosphoryl-(1,2-dichlorovinyl) disulfide;
O,O-di-m-bromophenyl-phosphoryl-(1,-bromo-2-chlorovinyl disulfide.

The compounds of the present invention can be made by reacting the appropriate O,O-dialkyl (or phenyl, or lower alkylphenyl or halophenyl) dithiophosphoric acid or alkali salt thereof or the appropriate O,O-dialkyl (or phenyl or lower alkylphenyl or halophenyl) thiophosphate with the appropriate polyhalovinyl sulfenyl chloride or polyhaloethyl sulfenyl chloride.

Examples of suitable phosphorus containing starting materials include O,O-dimethyl dithiophosphoric acid, O,O-diethyl dithiophosphoric acid, O,O-dipropyl dithiophosphoric acid, O,O-dibutyl dithiophosphoric acid, O,O-diisopropyl dithiophosphoric acid, O,O-di tertiary butyl dithiophosphoric acid, O,O-diphenyl dithiophosphoric acid, O,O-di-p-tolyl dithiophosphoric acid, O,O-di-p-chlorophenyl dithiophosphoric acid, sodium salt of O,O-dimethyl dithiophosphoric acid, and the potassium salt of O,O-diethyl dithiophosphoric acid, sodium (O,O-diethyl) thiolphosphate, O,O-diethyl thiolphosphoric acid, O,O-dimethyl thiolphosphoric acid, potassium (O,O-diethyl) thiolphosphate, sodium (O,O-dimethyl) thiolphosphate, sodium (O,O-dipropyl) thiolphosphate, sodium (O,O-diisopropyl) thiolphosphate, and the sodium (O,O-diphenyl) thiolphosphate.

Examples of suitable sulfenyl chlorides include
1,2-dichlorovinyl sulfenyl chloride,
2,2-dichlorovinyl sulfenyl chloride,
1,2,2-trichlorovinyl sulfenyl chloride,
1,2-dibromovinyl sulfenyl chloride,
1-chloro-2-bromovinyl sulfenyl chloride,
1,2,2-trichloroethyl sulfenyl chloride,
2,2,2-trichloroethyl sulfenyl chloride,
1,2,2,2-tetrachloroethyl sulfenyl chloride and
1,2,2-tribromoethyl sulfenyl chloride.

The polyhalovinyl compounds of the present invention can also be prepared by dehydrohalogenating the corresponding 1,2,2- or 2,2,2-trihaloethyl or 1,2,2,2-tetrahaloethyl compounds. Also, the appropriate phosphoryl thiosulfenyl chloride can be added to monochloro acetylene or to dichloroacetylene. The adduct formed from dichloroethylene can then be dehydrohalogenated in the event the polyhalovinyl compounds are to be prepared. Also, the appropriate di- or trialkyl phosphite can be reacted with the appropriate polyhalovinyl thiosulfenyl chloride.

The general procedure employed in Examples 1–10 (unless otherwise noted in the example) for preparing the compounds of the present invention was as follows:

1 part (a 5–10% excess) of the O,O-dialkyl (or diphenyl) dithiophosphoric acid or the sodium O,O-dialkyl thiolphosphate in 3 to 4 parts of an inert solvent or dispersing agent (chloroform and carbon tetrachloride being preferred) was reacted with aid of stirring and cooling at 5–10° C. with the indicated dichlorovinyl sulfenyl chloride or perchlorovinyl sulfenyl chloride or trichloroethyl sulfenyl chloride. The sulfenyl chloride was added dropwise.

In all cases in which the free acids were employed the reactions were carried out under a vacuum of 200–250 mm. Hg in order to reduce the concentration of anhydrous HCl in the reaction mixture. When the sodium salt of the acid was employed, the reaction was carried out at atmospheric pressure. In Examples 1, 2, 5, 6, 8, 9 and 10, as indicated, the O,O-dimethyl and O,O-diethyl dithiophosphoric acids were of 90% purity. The 10% impurity was highly water soluble and inert and was removed unchanged prior to the vacuum stripping.

The sulfenyl chloride was added at the rate of about one drop per two seconds or adjusted so as to maintain a colorless or faintly yellow solution if such rate did not give this color condition. The reaction was practically instantaneous and was easily visible by the rapid decoloration of each drop of the red sulfenyl chloride solution. The total reaction time for the quantities employed was about 10 minutes.

After standing for approximately one hour, the reaction mixtures were washed with cooling with dilute sodium bicarbonate solution to remove residual free HCl and unreacted thio or dithiophosphate, dried over anhydrous magnesium sulfate and stripped in high vacuum (less than 1 mm.) to remove all traces of solvent. In all cases in which the alkali salts of the thiophosphates were used a simple water wash was sufficient to dissolve the formed alkali chloride and remove excessive alkali thiophosphate.

The 2,2-dichlorovinyl phosphoryl disulfides could easily be distilled, whereas noticeable decomposition was observed on distillation of the 1,2-dichlorovinyl phosphoryl disulfides.

Unless otherwise indicated, all parts and percentages are by weight.

EXAMPLE 1

11.8 grams of 90% free acid containing O,O-dimethyl dithiophosphoric acid (0.067 mol of free acid) dissolved in 30 ml. of dry carbon tetrachloride were reacted in the manner described above with 10 grams (0.0612 mol) of 2,2-dichlorovinyl sulfenyl chloride to give 17.4 grams (99.8% yield) of crude O,O-dimethyl-thiophosphoryl-(2,2-dichlorovinyl) disulfide as a bright yellow oil, $n_D^{20}$ 1.6032. The pure disulfide obtained distilled at 103–105° C. at 0.017 mm. and had $n_D^{20}$ 1.6046, $d_{20}^{20}$ 1.475, Cl 25.6% (theory 24.9%), P 9.98% (theory 10.8%).

When 10.6 grams of pure O,O-dimethyl dithiophosphoric acid was used in place of the 11.8 grams of 90% free acid containing material, the resulting product obtained was the identical O,O-dimethyl-thiophosphoryl-(2,2-dichlorovinyl) disulfide.

EXAMPLE 2

13.0 grams of 90% free acid containing O,O-diethyl dithiophosphoric acid (0.063 mol) when dissolved in 50 ml. of dry carbon tetrachloride and reacted as described in Example 1 with 10 grams (0.0612 mol) of 2,2-dichlorovinyl sulfenyl chloride gave 18.0 grams (94% yield) of crude O,O-diethyl thiophosphoryl-(2,2-dichlorovinyl) disulfide as a bright yellow oil, $n_D^{20}$ 1.5747. The pure product had a B.P.$_{0.0175}$ 106–109° C., $n_D^{20}$ 1.5760, $d_{20}^{20}$ 1.367, Cl 24.0% (theory 22.7%), P 8.52% (theory 9.9%), S 28.8% (theory 30.7%).

EXAMPLE 3

12.0 grams (0.0624 mol) of sodium-(O,O-diethyl) thiolphosphate were suspended in 60 ml. of dry chloroform and were reacted as described in Example 1 with 10 grams (0.0612 mol) of 2,2-dichlorovinyl sulfenyl chloride to give 17.8 grams (98% yield) of crude O,O-diethyl phosphoryl-(2,2-dichlorovinyl) disulfide as a bright yellow oil, $n_D^{20}$ 1.5368. The distilled product had a B.P.$_{0.035}$ 113–115° C., $n_D^{20}$ 1.5374, $d_{20}^{20}$ 1.378, Cl 25.1% (theory 23.9%), P 9.24% (theory 10.4%), S 23.0% (theory 21.58%).

EXAMPLE 4

17.8 grams (0.063 mol) of diphenyl dithiophosphoric acid were suspended in 50 ml. of dry carbon tetrachloride and reacted as described in Example 1 with 10 grams (0.0612 mol) of 2,2-dichlorovinyl sulfenyl chloride to give 23 grams (92% yield) of crude O,O-diphenyl thiophosphoryl-(2,2-dichlorovinyl) disulfide as a heavy, deep yellow oil which decomposed on attempted distillation in high vacuum. The product had $n_D^{20}$ 1.6421, $d_{20}^{20}$ 1.404, Cl 17.4% (theory 17.35%), P 6.74% (theory 7.57%), S 24.1% (theory 23.45%).

EXAMPLE 5

11.8 grams of 90% pure O,O-dimethyl dithiophosphoric acid (0.067 mol based on the content of free acid) were diluted with 30 ml. of dry carbon tetrachloride and reacted as described above with 10 grams (0.0612 mol) of 1,2-dichlorovinyl sulfenyl chloride to give 17.0 grams (97.5% yield) of crude O,O-dimethyl thiophosphoryl-(1,2-dichlorovinyl) disulfide as a yellow oil, $n_D^{20}$ 1.6021. Noticeable decomposition was observed on distillation in vacuum. However, the pure material appeared to boil at 125–130° C. at 0.1 mm. Hg. It had an $n_D^{20}$ 1.6014, $d_{20}^{20}$ 1.492, Cl 25.5% (theory 24.9%), P 9.8% (theory 10.8%), S 33.4% (theory 33.7%).

EXAMPLE 6

13 grams of 90% pure O,O-diethyl dithiophosphoric acid (0.063 mol based on the free acid content) were suspended in 50 ml. of dry carbon tetrachloride and reacted as described in Example 5 with 10 grams (0.0612 mol) of 1,2-dichlorovinyl sulfenyl chloride to give 18.5 grams (94.5% yield) of crude O,O-diethyl thiophosphoryl-(1,2-dichlorovinyl) disulfide as a yellow oil, $n_D^{20}$ 1.5750. Distillation in high vacuum proceeded with some decomposition. The pure product had a boiling point of 130–135° C. at 0.08 mm. The distillate had $n_D^{20}$ 1.5752, $d_{20}^{20}$ 1.382, Cl 24.6% (theory 22.6%), P 8.55% (theory 9.9%), S 29.8% (theory 30.7%).

EXAMPLE 7

12.0 grams (0.0624 mol) of sodium O,O-diethyl thiolphosphate were suspended in 50 ml. of dry chloroform and reacted in the above described fashion with 10 grams (0.0612 mol) of 1,2-dichlorovinyl sulfenyl chloride to give 17.0 grams (89.5% yield) of crude O,O-diethyl phosphoryl-(1,2-dichlorovinyl) disulfide as a brown oil, $n_D^{20}$ 1.5370. Distillation proceeded with decomposition. The approximate boiling point was 130–135° C. at 0.07 mm. The distillate had an $n_D^{20}$ 1.5409, $d_{20}^{20}$ 1.395, Cl 24.9% (theory 23.9%), P 8.98% (theory 10.4%), S 22.1% (theory 21.6%).

EXAMPLE 8

16.0 grams of 90% pure O,O-diethyl dithiophosphoric acid (0.079 mol based on the free acid content) were diluted with 50 ml. of dry carbon tetrachloride and reacted in the above described manner with 15.0 grams (0.075 mol) of fresh perchlorovinyl sulfenyl chloride to give 24.5 grams (94.8% yield) of crude O,O-diethyl-thiophosphoryl-(1,2,2-trichlorovinyl) disulfide as a bright yellow oil, $n_D^{20}$ 1.5850. The pure product had a B.P.$_{0.023}$ 112–114° C. (with some decomposition), $n_D^{20}$ 1.5893, $d_{20}^{20}$ 1.4456, Cl 30.3% (theory 30.6%), S 27.4% (theory 27.6%), P 8.2% (theory 8.9%).

EXAMPLE 9

16.0 grams of 90% pure O,O-diethyl dithiophosphoric acid (0.079 mol based on the free acid content) were diluted with 50 ml. of dry carbon tetrachloride and reacted in the above described manner with 15 grams (0.075 mol) of 1,2,2-trichloroethyl sulfenyl chloride to give 24.5 grams (93.5% yield) of crude O,O-diethyl-thiophosphoryl-(1,2,2-trichloroethyl) disulfide as an almost colorless oil, $n_D^{20}$ 1.5636. The pure product distilled at 124–126° C., at 0.022 mm. Hg as a faintly yellow oil, $n_D^{20}$ 1.5665, $d_{20}^{20}$ 1.4235, Cl 30.4% (theory 30.4%), S 27.0% (theory 27.48%), P 8.2% (theory 8.86%).

EXAMPLE 10

16.0 grams of 90% pure O,O-diethyl dithiophosphoric acid (0.079 mol based on the free acid content) were diluted with 50 ml. of dry carbon tetrachloride and reacted in the above described manner with 15 grams (0.075 mol) of 2,2,2-trichloroethyl sulfenyl chloride to give 24.4 grams (93% yield) of crude O,O-diethyl-thiophosphoryl-(2,2,2-trichloroethyl) disulfide as a colorless oil, $n_D^{20}$ 1.5592. The pure product had a B.P. $_{0.02}$ 124° C., $n_D^{20}$ 1.5608, $d_{20}^{20}$ 1.4081, Cl 30.8% (theory 30.4%), S 27.4% (theory 27.48%), P 8.0% (theory 8.86%).

EXAMPLE 11

9.7 grams (0.0277 mol) of the crude O,O-diethyl-thiophosphoryl (2,2,2-trichloroethyl) disulfide prepared in Example 10 were diluted with 50 ml. of dry benzene, warmed on a water bath to 50–55° C. and reacted by dropwise addition under stirring of a total of 2.8 grams (a slight excess) of triethyl amine. The dehydrochlorination was completed by keeping the reactant mixture at 60° C. for a further 30 minutes. The product in the benzene was then washed with water, dilute hydrochloric acid and dilute sodium bicarbonate. The benzene solution was dried over anhydrous magnesium sulfate and high vacuum stripped to give 8.0 grams (92.5%) of crude O,O-diethyl-thiophosphoryl-(2,2-dichlorovinyl) disulfide as a reddish oil $n_D^{20}$ 1.5813. Distillation in high vacuum furnished the pure product which had similar properties to that of the pure product of Example 2.

The compounds of the present invention can be used alone as nematocides, fungicides, insecticides (e.g., against two spotted mites, roaches and milk weed bug), bactericides, but it has been found desirable to apply them to the pest, e.g., to the soil habitat of nematodes, together with inert solids to form dusts or, more preferably, suspended in a suitable liquid diluent, preferably water. There can also be added surface active agents or wetting agents and inert solids in such liquid formulations. Desirably, 0.25–1% by weight of surface active or wetting agent is employed. The active ingredient can be from 0.01 to 95% by weight of the entire composition in such case.

In place of water there can be employed organic solvents as carriers, e.g., hydrocarbons such as benzene, toluene, xylene, kerosene, diesel oil, fuel oil, and petroleum naptha, ketones such as acetone, methyl ethyl ketone and cyclohexanone, chlorinated hydrocarbons such as carbon tetrachloride, chloroform, trichloroethylene and perchloroethylene, esters such as ethyl acetate, amyl acetate and butyl acetate, ethers, e.g., ethylene glycol monomethyl ether and diethylene glycol monomethyl ether, alcohols, e.g., ethanol, methanol, isopropanol, amyl alcohol, ethylene glycol, propylene glycol, and glycerine. Mixtures of water and organic solvents, either as solutions or emulsions, can be employed.

The novel pesticides can also be applied as aerosols, e.g., by dispersing them in air by means of a compressed gas such as dichlorodifluoromethane or trichlorofluoromethane and other Freons, for example.

The pesticides of the present invention can also be applied with nematocidal, fungicidal, bactericidal and insecticidal adjuvants or carriers such as talc, pyrophyllite, synthetic fine silica, attapulgus clay, kieselguhr, chalk, diatomaceous earth, lime, calcium carbonate, bentonite, fuller's earth, cottonseed hulls, wheat flour, soybean flour, pumice, tripoli, wood flour, walnut shell flour, redwood flour and lignin.

It is frequently desirable to incorporate a surface active agent in the pesticidal compositions of the present invention. Such surface active or wetting agents are advantageously employed in both the solid and liquid compositions. The surface active agent can be anionic, cationic or nonionic in character.

Typical classes of surface active agents include alkyl sulfonate salts, alkylaryl sulfonate salts, alkyl sulfate salts, alkylamide sulfonate salts, alkylaryl polyether alcohols, fatty acid esters of polyhydric alcohols and the alkylene oxide addition products of such esters, and addition products of long chain mercaptans and alkylene oxides. Typical examples of such surface active agents include the sodium alkylbenzene sulfonates having 10 to 18 carbon atoms in the alkyl group, alkylphenol ethylene oxide condensation products, e.g., p-isooctylphenol condensed with 10 ethylene oxide units, soaps, e.g., sodium stearate and potassium oleate, sodium salt of propynaphthalene sulfonic acid, (di-2-ethylhexyl) ester of sodium sulfosuccinic acid, sodium lauryl sulfate, sodium salt of the sulfonated monoglyceride of cocoanut fatty acids, sorbitan sesquioleate, lauryl trimethyl ammonium chloride, octadecyl trimethyl ammonium chloride, octadecyl trimethyl ammonium chloride, polyethylene glycol lauryl ether, polyethylene esters of fatty acids and rosin acids, e.g., Ethofat 7 and 13, sodium N-methyl-N-oleyltaurate, Turkey red oil, sodium dibutylnaphthalene sulfonate, sodium lignin sulfonate (Marasperse N), polyethylene glycol stearate, sodium dodecylbenzene sulfonate, tertiary dodecyl polyethylene glycol thioether (Nonionic 218), long chain ethylene oxidepropylene oxide condensation products, e.g., Pluronic 61 (molecular weight 1000), sorbitan sesquioleate, polyethylene glycol ester of tall oil acids, sodium octyl phenoxyethoxyethyl sulfate, tris (polyoxyethylene) sorbitan monostearate (Tween 60), sodium dihexyl sulfosuccinate.

The solid and liquid formulations can be prepared by any of the conventional procedures. Thus, the active ingredient can be mixed with the solid carrier in finely divided form in amounts small enough to preserve the free-flowing property of the final dust composition.

In the following examples or tables illustrating nematocidal and fungicidal activity the phosphorus-containing disulfides were formulated as wettable powders consisting of 50% of the phosphorus-containing disulfide, 46% ultra fine silica (Hi-Sil), 2% sodium lignin sulfonate and 2% Pluronic L-61 (polyethylene oxide-propylene oxide adduct, molecular weight about 1000). This wettable powder is hereinafter designated as Formulation A.

Formulation A was diluted with water to such an extent to give the final concentrations of the phosphorus-containing disulfide indicated in Table 1.

The saprophytic nematode tests recorded in Table 1 were carried out in water as the medium with Panagrellus and Rhabditis spp. at room temperature. The results were recorded as percent kill after a 2-day incubation period. The blank mortality was a 5–10% kill.

*Table 1*

| Compound | Percent Kill of Nematodes at Rates, p.p.m. | | | | |
|---|---|---|---|---|---|
| | 200 | 100 | 50 | 25 | 12.5 |
| $(MeO)_2P(S)SSCH=CCl_2$ | 100 | 100 | 100 | 100 | 80 |
| $(EtO)_2P(S)SSCH=CCl_2$ | 80 | 50 | 50 | 50 | 10 |
| $(EtO)_2P(O)SSCH=CCl_2$ | 100 | 100 | 100 | 100 | 100 |
| $(PhO)_2P(S)SSCH=CCl_2$ | 70 | 50 | 30 | 10 | 10 |
| $(MeO)_2P(S)SSCCl=CHCl$ | 100 | 100 | 100 | 80 | 80 |
| $(EtO)_2P(S)SSCCl=CHCl$ | 100 | 100 | 100 | 100 | 100 |
| $(EtO)_2P(O)SSCCl=CHCl$ | 100 | 100 | 70 | 70 | 70 |
| $(EtO)_2P(S)SSCCl=CCl_2$ | 80 | 80 | 60 | 40 | 40 |
| $(EtO)_2P(S)SSCHClCHCl_2$ | 70 | 70 | 40 | 10 | 10 |
| $(EtO)_2P(S)SSCH_2CCl_3$ | 40 | 10 | 10 | 10 | 10 |

From the above test, it can be seen that the lower alkyl analogues possess superior activity to the phenyl analogue in the polyhalovinyl series. Also, the lower alkyl polyhalovinyl compounds were considerably superior to the corresponding trihaloethyl compounds.

In commercial practice the compositions containing the nematocides of the present invention are applied to the soil infested with nematodes.

The compounds were also tested as fungicides in plate fungicide tests against Pythium spp. and Rhizoctonia as shown in Table 2. The compounds were made up into Formulation A and then added to agar cultures of the fungi. In the table, 10 indicates 100% effectiveness and 0 indicates no effectiveness. The concentrations are expressed as p.p.m. (parts per million).

*Table 2*

| Compound | Fungicidal Activity Against— | | | | | | | |
|---|---|---|---|---|---|---|---|---|
| | Pythium | | | | Rhizoctonia | | | |
| | 1,000 | 500 | 100 | 10 | 1,000 | 500 | 100 | 10 |
| $(MeO)_2P(S)SSCH=CCl_2$ | 10 | 10 | 10 | 8 | 10 | 10 | 10 | 3 |
| $(EtO)_2P(S)SSCH=CCl_2$ | 10 | 8 | 4 | 0 | 10 | 8 | 6 | 5 |
| $(EtO)_2P(O)SSCH=CCl_2$ | 10 | 10 | 8 | 0 | 10 | 9 | 5 | 4 |
| $(PhO)_2P(S)SSCH=CCl_2$ | 10 | 10 | 0 | 0 | 10 | 8 | 4 | 3 |
| $(MeO)_2P(S)SSCCl=CHCl$ | 10 | 10 | 8 | 5 | 10 | 10 | 8 | 0 |
| $(EtO)_2P(S)SSCCl=CHCl$ | 10 | 10 | 10 | 8 | 10 | 8 | 8 | 8 |
| $(EtO)_2P(O)SSCCl=CHCl$ | 10 | 10 | 8 | 0 | 10 | 10 | 8 | 5 |
| $(EtO)_1P(S)SSCCl=CCl_2$ | 10 | 0 | 0 | 0 | 4 | 0 | 0 | 0 |
| $(EtO)_2P(S)SSCHClCHCl_2$ | 10 | 0 | 0 | 0 | 10 | 10 | 10 | ----- |
| $(EtO)_2P(S)SSCH_2CCl_3$ | 10 | 0 | 0 | 0 | 3 | 0 | 0 | 0 |

Bactericide tests were run by incorporating the compounds in Formulation A and adding this mixture to an agar culture of the bacteria. Dimethyl-thiophosphoryl-(2,2-dichlorovinyl) disulfide and diethyl-thiophosphoryl-(2,2-dichlorovinyl) disulfide showed activity at 1000 p.p.m. against *Xanthomonas vesicatoria.*

I claim:

1. A compound having the formula 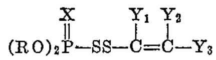 where R is selected from the group consisting of lower alkyl, phenyl, lower alkylphenyl, and halophenyl, $Y_1$, $Y_2$ and $Y_3$ are selected from the group consisting of hydrogen and halogen with at least two of $Y_1$, $Y_2$ and $Y_3$ being halogen, X is a halogen of atomic weight between 16 and 32 and all halogen atoms of said compound have an atomic weight between 35 and 80.

2. Di lower alkyl thiophosphoryl (polychlorovinyl) disulfide.

3. A compound according to claim 2 wherein the lower alkyl groups have 1 to 2 carbon atoms.

4. A compound according to claim 3 wherein the polychlorovinyl group has 2 chlorine atoms.

5. Dimethyl - thiophosphoryl-(2,2-dichlorovinyl) disulfide.

6. Diethyl-thiophosphoryl - (2,2 - dichlorovinyl) disulfide.

7. Dimethyl - thiophosphoryl-(1,2-dichlorovinyl) disulfide.

8. Diethyl-thiophosphoryl - (1,2 - dichlorovinyl) disulfide.

9. Di lower alkyl phosphoryl (polychlorovinyl) disulfide.

10. A compound according to claim 9 wherein the lower alkyl groups have 1 to 2 carbon atoms.

11. A compound according to claim 10 wherein the polychlorovinyl group has 2 chlorine atoms.

12. Diethyl phosphoryl - (2,2 - dichlorovinyl) disulfide.

13. Di lower alkyl phosphoryl-(2,2-dichlorovinyl) disulfide having 1 to 2 carbon atoms in the alkyl groups.

14. A process of killing nematodes comprising subjecting the nematodes to a nematocidally effective amount of a compound having a formula selected from the group consisting of and where R is selected from the group consisting of lower alkyl, phenyl, lower alkylphenyl, and halophenyl, $R_1$ is lower alkyl, $Y_1$, $Y_2$ and $Y_3$ are selected from the group consisting of hydrogen and halogen with at least two of $Y_1$, $Y_2$ and $Y_3$ being halogen and $Y_4$ is halogen, X is a chalcogen of atomic weight between 16 and 32 and all halogen atoms of said compound have an atomic weight between 35 and 80.

15. A process of killing nematodes comprising subjecting the nematodes to a nematocidally effective amount of di lower alkyl thiophosphoryl (polychlorovinyl) disulfide.

16. A process according to claim 15 wherein the alkyl groups have 1 to 2 carbon atoms and the polychlorovinyl group has 2 chlorine atoms.

17. A process of killing nematodes comprising subjecting the nematodes to a nematocidally effective amount of di lower alkyl phosphoryl (polychlorovinyl) disulfide.

18. A process according to claim 17 wherein the alkyl groups have 1 to 2 carbon atoms and the polychlorovinyl group has 2 chlorine atoms.

19. A process of killing fungi comprising subjecting said fungi to a fungicidally effective amount of a compound of claim 1.

20. A process of killing fungi comprising subjecting said fungi to a fungicidally effective amount of di lower alkyl thiophosphoryl (polychlorovinyl) disulfide.

21. A process according to claim 20 wherein the alkyl groups have 1 to 2 carbon atoms and the polychlorovinyl group has 2 chlorine atoms.

22. A process of killing fungi comprising subjecting said fungi to a fungicidally effective amount of di lower alkyl phosphoryl (polychlorovinyl) disulfide.

References Cited in the file of this patent

UNITED STATES PATENTS

| | | |
|---|---|---|
| 2,911,335 | Gilbert | Nov. 3, 1959 |
| 3,018,215 | Pianka | Jan. 23, 1962 |
| 3,035,082 | Lorenz | May 15, 1962 |